United States Patent
Cuscurida et al.

Patent Number: 5,191,033
Date of Patent: Mar. 2, 1993

[54] EPOXY RESIN COMPOSITION CONTAINING AMINATED EPOXY RESIN-ALKYLENE OXIDE POLYOLS

[75] Inventors: Michael Cuscurida; George P. Speranza, both of Austin; Kathy B. Sellstrom, Pflugerville, all of Tex.

[73] Assignee: Texaco Chemical Company, White Plains, N.Y.

[21] Appl. No.: 880,855

[22] Filed: May 11, 1992

[51] Int. Cl.$^5$ .................... C08G 59/40; C08G 59/62; C08G 65/00
[52] U.S. Cl. .................... 525/407; 525/504; 525/526; 528/98; 528/99; 528/103; 528/104; 528/111; 528/341; 528/407
[58] Field of Search ...................... 525/407, 526, 504; 528/99, 103, 104, 98, 111, 341, 407

[56] References Cited

U.S. PATENT DOCUMENTS

| | | | |
|---|---|---|---|
| 4,316,991 | 2/1982 | Speranza et al. | 525/507 |
| 4,323,658 | 4/1982 | Speranza et al. | 525/507 |

Primary Examiner—John C. Bleutge
Assistant Examiner—Frederick Krass
Attorney, Agent, or Firm—Jack H. Park; Kenneth R. Priem; Richard A. Morgan

[57] ABSTRACT

The invention is an epoxy resin composition. Diol initiators are reacted with alkylene oxide and 1 to 5 wt % epoxy resin. The epoxy resin is added internally, along the length of the diol chain to yield a modified polyol of molecular weight 2000 to 5000. The modified polyol is subjected to reductive amination to yield a polyamine. This polyamine is mixed with an epoxy base resin and cured to product epoxy resins demonstrating improved strength and adhesion.

20 Claims, No Drawings

EPOXY RESIN COMPOSITION CONTAINING AMINATED EPOXY RESIN-ALKYLENE OXIDE POLYOLS

BACKGROUND OF THE INVENTION

1. Field of the Invention

This invention relates to an epoxy resin composition. The invention also relates to a method of preparing an epoxy resin composition.

2. Description of the Relevant Art

Epoxy resins constitute a broad class of polymeric materials having a wide range of physical properties. The resins are characterized by epoxide groups which are cured by reaction with certain catalysts or curing agents to provide cured epoxy resin compositions with certain desirable properties.

The most common epoxy resins are a condensation product of epichlorohydrin and bisphenol A. These resins can be cured with conventional curing agents such as polyamines, polycarboxylic acids, anhydrides and Lewis acids. Bisphenol A based epoxy compositions when cured have good adhesive properties but many are inherently stiff and brittle and hence their use is limited to applications where peel forces are not significant.

It has been found that plasticizers can be added to an epoxy resin adhesive system to improve flexural strength. Typical methods of plasticization include the addition of flexibilizing aliphatic amines to the curing agent, addition of aminated or carboxylated rubbers to the system, addition of carboxy-terminated polyesters, addition of organic hydroxyl containing compounds and the addition of epoxidized oils.

A process for preparing polyoxyalkylene polyamines is described in U.S. Pat. No. 3,654,370 to Yeakey. This patent describes curing agents for epoxy resins of the formula

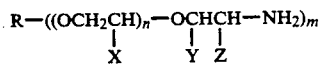

wherein R is the nucleus of an oxyalkylation susceptible polyhydric alcohol containing 2 to 12 carbon atoms and 2 to 8 hydroxyl groups, Z is an alkyl group containing 1-18 carbon atoms, X and Y are hydrogen or Z, n has an average value of 0 to 50 and m is an integer of 2 to 8 corresponding to the number of hydroxyl groups in the polyhydric alcohol. These amines are synthesized by means of a nickel, copper and chromium amination catalyst.

U.S. Pat. No. 3,236,895 to J. M. Lee and J. C. Winfrey and U.S. Pat. No. 3,462,393 to Legler are pioneer patents. They describe a series of amine compounds which are solids or liquids and have utility particularly in curing epoxy resins. The amine compounds have the general formula:

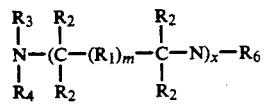

wherein Rs are selectively defined as hydrogen, alkyl radicals and alkylene oxide radicals and x and m are defined integers.

U.S. Pat. No. 4,316,991 to G. P. Speranza et al discloses modified polyols for use in preparing flexible urethane foams. A polyol initiator is reacted with one or more alkylene oxides and an epoxy resin in such a manner that the epoxy resin is added internally along the length of the polyol chain. The result is a modified polyol having a molecular weight in the range of 2,000 to 7,000. U.S. Pat. No. 4,373,034 to G. P. Speranza et al discloses the reaction of these modified polyols with polyisocyanate and a foam catalyst in the presence of a blowing agent to yield a flexible polyurethane foam.

U.S. Pat. No. 3,299,169 to J. C. Smith discloses an elastomeric epoxy resin. Epoxy resins are cured with a polyoxyalkyleneamine to yield these compositions.

SUMMARY OF THE INVENTION

The invention is an epoxy resin composition. The composition comprises a vicinal polyepoxide having an average of at least 1.8 reactive 1,2-epoxy groups per molecule and a curing amount of a curative comprising a polyamine curing agent.

The polyamine curing agent is produced by the process of reacting a diol initiator, one or more alkylene oxides, and an intermediate epoxy resin such that the ratio of hydroxyl functionality to equivalents of intermediate epoxy resin is at least 2 to 1, and in such a manner that the intermediate epoxy resin is added internally along the length of the polyol chain. The resulting modified polyol has a molecular weight of 2000 to 5000. The modified polyol is aminated to yield the polyamine curing agent.

The cured epoxy resin compositions have improved strength properties compared with epoxy resins cured with polyoxyalkyleneamines. Adhesion properties were significantly improved. The polyamine may be used alone to cure epoxy resins or in admixture with co-curative polyamines to produce adhesives and coatings.

DESCRIPTION OF THE PREFERRED EMBODIMENTS

U.S. Pat. No. 4,316,991 to G. P. Speranza et al incorporated herein by reference discloses a method of preparing the epoxy resin modified polyols of the invention.

The modified polyols of this invention may be made by reacting a diol initiator with one or more alkylene oxides to extend the diol chain, and adding epoxy resin in such a manner that the epoxy resin is added at selected points internally along the length of the diol chain. This increases the overall functionality of the chain. At least two equivalents of hydroxyl functionality should be present per equivalent of epoxy resin added to the reaction mixture to avoid gelling of the epoxy by cross linking with itself. The epoxy resin may be added before, during and/or after the addition of alkylene oxide to the diol initiator. The best results are obtained if the resin is not added only as a "cap", that is, after all of the oxide has been added which results in the resin being attached to the end of the resulting polyol chain only. One skilled in the art who is practicing this invention may determine the best procedure with respect to when additions should be made and at what temperature and during which times the reaction mixture is to be heated within the scope of this invention.

Polyether diols having equivalent weights of up to about 750 are normally prepared in a one-step process by the reaction of propylene oxide with such an initiator. For the preparation of larger molecules, a two-step process is usually employed. In the first step, a product having an equivalent weight of from about 150 to about 750 is prepared, and in the second step this is further reacted with propylene oxide to prepare the higher molecular weight product.

The alkylene oxides useful in this invention are ethylene oxide, propylene oxide and 1,2-butylene oxide. Ethylene oxide and propylene oxide are preferred for this invention, and these reactants are used in the examples herein. More than one alkylene oxide may be added to the reaction mixture as deemed necessary by one skilled in the art practicing this invention.

It is anticipated that a wide variety of epoxy resins are useful in practicing this invention. Both the epoxy resin intermediate and the vicinal polyepoxide are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the base resin, which has an epoxide equivalent weight of from 175 to 195, is derived from condensing epichlorohydrin with 2,2-bis(p-hydroxyphenyl propane) to form 2,2-bis[(p-2,3 epoxy propoxy)phenyl] propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the present invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis-(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be amine cured and are in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The reaction conditions of temperature and pressure may be selected by the invention practitioner to meet certain specifications required by the polyol for a particular use. U.S. Pat. No. 4,316,991 to Speranza et al. discloses a pressure of about 50 psig and a temperature of about 50° C. to 150° C. as representative conditions for making the modified polyols. The amount of epoxy resin to be added to the reaction mixture should be such that the epoxy equivalents present are less than half of the hydroxyl functionality equivalents present in the reaction mixture. Too many epoxy equivalents in relation to the hydroxyl equivalents may cause the epoxy resin to gel by cross-linking with itself. As a result a large excess of hydroxyl equivalents may be used in the reaction mixture and still be within the spirit and scope of this invention. The modified polyol resulting from the method of this invention would preferably have a molecular weight in the range of 2000 to 5000.

U.S. Pat. No. 3,654,370 to E. L. Yeakey incorporated herein by reference discloses a method of preparing polyamines from the modified polyols. The modified polyol is treated with ammonia and hydrogen at a temperature of 150° C. to 275° C. and a pressure of 35 atm. to 340 atm. over a catalyst prepared by the reduction of a mixture of oxides of nickel, copper and chromium, the proportion of metals to each other, calculated on an oxide free basis, being 60 to 85 mole % nickel, 14 to 37 mole % copper and 1 to 5 mole % chromium. Raney nickel is also known as an amination catalyst.

The polyamine curative can be used as the sole curative or it may be used in a mixture with conventional co-curing agents. For example, the curative may comprise a 5:1 to 1:5, preferably 2:1 to 1:2 weight ratio inventive polyamine to co-curing agent. The polyamine co-curing agents which can be utilized in accordance with the instant invention are generally any of those polyamine curing agents which are well-known to be useful for the curing of vicinal epoxides. Generally, those curing agents having at least three reactive amino hydrogens are useful.

Exemplary of those amines which can be utilized are alkylene polyamines such as diethylene triamine, triethylene tetramine and the like, oxyalkylene polyamines such as polyoxypropylene, di- and triamine and 1,13-diamino 4,7,10-trioxatridecane.

Additionally, aromatic amine curing agents are useful, such as the alkylene-linked polyphenyl amines, phenylene diamines and polycyclic or fused aromatic primary amine compounds. Additionally, the corresponding cycloaliphatic compounds can be used.

Likewise, the polyamide curing agents such as the condensation products of polyamines and polycarboxylic acids are useful. Suitable such amide compounds are, for example, the condensation product of a polyamine and a dimerized fatty acid produced in accordance With U.S. Pat. No. 2,379,413.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

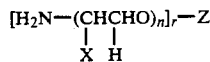

wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. The most preferred polyoxyalkylene polyamines are the polyoxypropylene diamines wherein X is a methyl radical, n is a number from 1 to 10, Z is a 1,2-propylene radical and r is about 2. These polyoxyalkylene polyamines can be prepared by known methods as disclosed in U.S. Pat. Nos. 3,236,895 and 4,654,370. The most preferred polyoxyalkylene polyamine is a polyoxypropylene diamine having a molecular weight of about 230.

Another preferred class of polyoxyalkylene polyamines can be depicted by the formula:

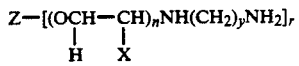

wherein X, Z, n and r are defined above and y is 2 or 3. These poly(aminoalkylamino)polyethers are the hydrogenated product of the cyanoalkylated adduct of a polyoxyalkylene polyamine as described. The preparation of the cyanoalkylated adducts is described in U.S. Pat. No. 3,666,788 to Rowton.

Examples of preferred alkanolamines useful in the invention include mono-, di- and triethanolamine, hydroxy ethoxyethylamine, N-aminoethylethanolamine, N,N-bis(hydroxypropyl), N-hydroxyethylamine and the like.

U.S. Pat. No. 3,654,370 to Yeakey describes a process for preparing polyoxyalkylene polyamines of the formula:

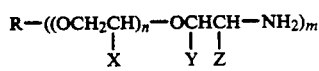

wherein R is the nucleus of an oxyalkylation susceptible polyhydric alcohol containing 2 to 12 carbon atoms and 2 to 8 hydroxyl groups, Z is an alkyl group containing 1 to 18 carbon atoms, X and Y are hydrogen or Z, n has an average value of 0 to 50 and m is an integer of 2 to 8 corresponding to the number of hydroxyl groups in the polyhydric alcohol.

Epoxy base resin, modified curative and optionally an accelerator are mixed immediately prior to use and applied directly to the surface to be coated prior to curing.

The curative agent is usually added to the formulation in such an amount that there is one reactive NH group in the curing component for each epoxy group in the epoxy resin component. These are known as stoichiometric quantities. The stoichiometric quantity can be calculated from the knowledge of the chemical structure and analytical data on the component.

For the purposes of the present invention, the stoichiometric amount of curative agent is calculated by adding together the number of equivalents on the basis of weight percent together the number of equivalents on the basis of weight percent replaceable NH groups.

Stoichiometry unfortunately is not always calculatable. The proper amount of curative to provide best properties may be determined empirically. One example of such a method is measuring the maximum glass transition temperature during the curing of the epoxy resin in a series of different curing agent concentrations. A graph of the glass transition temperature versus the concentration of curing agent exhibits a maxima at or near the stoichiometric quantity. For another example, the curing amount of curative is the quantity which maximizes a desirable physical property. Typically, the property maximized is either the glass transition temperature (Tg) or heat deflection temperature (HDT).

With many curatives, curing may be accomplished at ambient conditions. For development of optimum achievable properties, however, curing at elevated temperature is necessary. The curing temperature range acceptable in this invention is from about 80° C. to about 180° C. for about 1 to 10 hours. It has been found that good physical properties are achieved by a cure at a temperature of 80° C. for about 2 hours, followed by an additional cure at 125° C. for about 3 hours.

The invention is shown by way of example.

EXAMPLE 1A

A 2000 molecular weight diol was prepared and modified by reaction with two weight percent diglycidyl ether of bisphenol-A.

A ten-gallon reactor was charged with 10 lbs. of precatalyzed polypropylene glycol (400 molecular weight, alkalinity mg KOH/g 19.1, hydroxyl no., corr., mg KOH/g 265). The reactor was purged with prepurified nitrogen and heated to 100° C. with continuing nitrogen purge. The initiator was dried to a water content of less than 0.15% using both vacuum and nitrogen stripping. Propylene oxide (20 lb.) was then reacted at 110° C. to 115° C. at 50 psig. The reaction mixture was digested two hours to an equilibrium pressure. Diglycidyl ether of bisphenol A (1.0 lb.) was then charged to the kettle and digested 30 minutes. Propylene oxide (20 lb.) was then reacted at 110° C. to 115° C. at 50 psig and the reaction mixture was then purged 15 minutes with nitrogen. The alkaline product was neutralized at 95° C. by stirring two hours with 620 g Magnesol 30/40 adsorbent which was added as an aqueous slurry. The neutralized product was then vacuum stripped to a minimum pressure, nitrogen stripped, and filtered. Properties of the finished product were as follows:

| Properties | |
|---|---|
| Acid no., mg KOH/g | 0.019 |
| Hydroxyl no., mg KOH/g | 57.9 |
| Water, wt. % | 0.078 |
| Unsaturation, meq/g | 0.052 |
| pH in 10:6 isopropanol-water | 7.5 |
| Color, Pt-Co | 100 |
| Sodium, ppm | 10.6 |
| Potassium, ppm | 0.5 |
| Viscosity, cs | |
| 77° F. | 444 |
| 100° F. | 221 |

EXAMPLE 1B

Reductive Amination of the Modified Polyol

The polyol of Example 1A (1.0 lb./hr.), ammonia (1.0 lb./hr.) and hydrogen (53 lb./hr.) were fed to a tubular reactor filled with 1250 cc of a nickel amination catalyst at 210° C. and 4 mm Hg for one hour. The finished product was recovered and had the following properties:

| | |
|---|---|
| Total acetylatables, meq/g | 1.06 |
| Total amine, meq/g | 1.03 |
| Primary amine, meq/g | 1.02 |
| Viscosity, 77° F., cs | 305 |

EXAMPLE 1C

A liquid epoxy resin (diglycidyl ether of bisphenol A) was cured with the polyamine of Example 1B.

| | A | B |
|---|---|---|
| Formulation, (parts by weight) | | |
| Liquid epoxy resin (EEW 188) | 100 | 100 |
| Polyamine of Example 1B | 24.7 | 0 |
| JEFFAMINE ® D-400 | 49.3 | 49.3 |
| JEFFAMINE ® D-2000 | 0 | 24.7 |
| Glass transition temperature | 30.7° C. | 29.1° C. |
| EEW - epoxy equivalent weight | | |
| Properties of Cured ⅛-inch Castings | | |
| Cured 2 hrs., 80° C., 3 hrs., 125° C. | | |
| Shore D hardness, 0-10 sec | 75-66 | 74-60 |
| HDT, °C., 264 psi load | 31.2 | 31.0 |
| Izod impact strength, ft-lb/in | 3.46 | 6.11 |
| Tensile strength, psi | 1700 | 1300 |
| Tensile modulus, psi | 30000 | 30000 |
| Elongation at break, % | 101 | 100 |
| Flexural strength, psi | 900 | 680 |
| Flexural modulus, psi | 36000 | 26000 |
| % wt. gain, 24-hr water boil | 2.7 | 2.6 |
| 3-hr acetone boil | 37.5 | 36.7 |
| Compression strength, psi | 47000 | 35000 |
| Adhesion Properties | | |
| Cured 1 hr 125° C. | | |
| Tensile shear strength, psi | 900 | 800 |
| T-peel strength, pli | 29 | 18 |

Improvements were noted in strength properties (tensile, flexural and compression). Increase in modulus values and reduction in Izod impact strength indicate that a slightly less flexible cured epoxy was produced with the experimental co-curing agent. For adhesion properties, tensile shear strength remained about the same but peel strength increased significantly.

TABLE OF COMPOUNDS

JEFFAMINE ® D-230, D-400 and D-2000 are represented by the structure:

$$H_2NCH(CH_3)CH_2-[OCH_2CH(CH_3)]_x)NH_2$$

| wherein: | JEFFAMINE ® | x(approx.) |
|---|---|---|
| | D-2000 | 33.1 |
| | D-400 | 5.6 |
| | D-230 | 2.6 |

| TABLE OF TEST METHODS | |
|---|---|
| Shore D-Hardness 0-10 seconds | ASTM D-2240 |
| Elongation at Break (%) | ASTM D-638 |
| Heat Deflection Temperature (HDT) (°C., 264 psi/66 psi) | ASTM D-648 |
| Izod Impact Strength (ft. lbs./in.) | ASTM D-256 |
| Tensile strength (psi) | ASTM D-638 |
| Tensile Modulus (psi) | ASTM D-638 |
| Flexural Strength (psi) | ASTM D-790 |
| Flexural Modulus (psi) | ASTM D-790 |
| Compression Strength (psi) | ASTM D-695 |
| T-peel strength (pli) | ASTM D-1876 |
| Tensile shear strength (psi) | ASTM D-1002 |
| Glass Transition temperature (°C.) | ASTM D-3418 |

While particular embodiments of the invention have been described, it will be understood, of course, that the invention is not limited thereto since many modifications may be made. It is therefore contemplated to cover by the appended claims any such modification as fall within the true spirit and scope of the claims.

What is claimed is:

1. An epoxy resin composition comprising the cured reaction product of a curable admixture which comprises a vicinal polyepoxide having an epoxide equivalence of 1.8 or greater and a curing amount of a curative comprising a polyamine produced by the process of:
    a. reacting
        i. a diol initiator,
        ii. one or more alkylene oxides, and
        iii. an intermediate epoxy resin in proportion such that the ratio of hydroxyl functionality to equivalents of intermediate epoxy resin is at least 2 to 1, and in such a manner that the intermediate epoxy resin is added internally along the length of the polyol chain to give a modified polyol having a molecular weight of 2000 to 5000, and
    b. aminating said modified polyol to yield said polyamine.

2. The epoxy resin composition of claim 1 wherein the diol initiator is a polypropylene glycol of from 200 to 1000 molecular weight.

3. The epoxy resin composition of claim 1 where the alkylene oxides are selected from the group consisting of ethylene oxide, propylene oxide and butylene oxide.

4. The epoxy resin composition of claim 1 where the intermediate epoxy resin is selected from the group of epoxy resins consisting of Bisphenol A diglycidyl ether resins, epoxy novolac resins and aliphatic epoxy resins.

5. The epoxy resin composition of claim 1 wherein in step a., reacting the diol initiator with alkylene oxide is carried out at a temperature in the range of 50° C. to 150° C.

6. The epoxy resin composition of claim 1 wherein the intermediate epoxy resin comprises 1 wt % to 5 wt % of the modified polyol.

7. The epoxy resin composition of claim 1 wherein the curative additionally comprises a co-curing agent.

8. The epoxy resin composition of claim 1 wherein the curative additionally comprises a co-curing agent in a weight ratio of 5:1 to 1:5 polyamine to co-curing agent.

9. The epoxy resin composition of claim 1 wherein the curative additionally comprises a co-curing agent in a weight ratio of 2:1 to 1:2 polyamine to co-curing agent.

10. A method of preparing an epoxy resin composition comprising:
   a. reacting
      i. a diol initiator,
      ii. one or more alkylene oxides, and
      iii. an intermediate epoxy resin in proportion such that the ratio of hydroxyl functionality to equivalents of intermediate epoxy resin is at least 2 to 1, and in such a manner that the intermediate epoxy resin is added internally along the length of the polyol chain to give a modified polyol having a molecular weight of 2000 to 5000,
   b. aminating said modified polyol to yield a polyamine,
   c. admixing a vicinal polyepoxide having an epoxy equivalence of 1.8 or greater with a curing amount of a curative comprising said polyamine, and,
   d. curing to yield said epoxy resin composition.

11. The method of claim 10 wherein the diol initiator is a polypropylene glycol of from 200 to about 1000 molecular weight.

12. The method of claim 10 wherein the alkylene oxides are selected from the group consisting of ethylene oxide, propylene oxide and butylene oxide.

13. The method of claim 10 wherein the intermediate epoxy resin is selected from the group of epoxy resins consisting of Bisphenol A diglycidyl ether resins, epoxy novolac resins and aliphatic epoxy resins.

14. The method of claim 10 wherein in step a., reacting the diol initiator with alkylene oxide is carried at a temperature in the range of 50° C. to 150° C.

15. The method of claim 10 wherein step b., aminating is carried out by means of an amination catalyst comprising metals selected from the group consisting of nickel, copper, cobalt and Raney nickel and oxides thereof and mixtures thereof, at a temperature in the range of 175° C. to 250° C. and a pressure of 35 atm to 205 atm.

16. The method of claim 10 wherein step d. curing is carried out at a temperature in the range of 60° C. to 150° C. for a time in the range of 1 hour to 60 hour.

17. The method of claim 10 wherein step a. the intermediate epoxy resin comprises 1 wt % to 5 wt % of the modified polyol.

18. The method of claim 10 where said curative additionally comprises a co-curing agent.

19. The method of claim 10 wherein said curative additionally comprises a co-curing agent in a weight ratio of 5:1 to 1:5 polyamine to co-curing agent.

20. The method of claim 10 wherein said curative additionally comprises a co-curing agent in a weight ratio of 2:1 to 1:2 polyamine to co-curing agent.

* * * * *